United States Patent [19]
Ishii et al.

[11] Patent Number: 5,838,717
[45] Date of Patent: *Nov. 17, 1998

[54] SPECTRUM SPREAD COMMUNICATION SYSTEM

[75] Inventors: Satoru Ishii; Atsushi Hoshikuki, both of Mobara, Japan

[73] Assignee: Futaba Denshi Kogyo K.K., Mobara, Japan

[*] Notice: This patent issued on a continued prosecution application filed under 37 CFR 1.53(d), and is subject to the twenty year patent term provisions of 35 U.S.C. 154(a)(2).

[21] Appl. No.: 500,748

[22] Filed: Jul. 11, 1995

[30] Foreign Application Priority Data

Jul. 12, 1994 [JP] Japan .................................. 6-181974

[51] Int. Cl.⁶ .............................. H04B 1/69; H04B 1/707
[52] U.S. Cl. .......................... 375/201; 375/202; 375/206
[58] Field of Search .................... 375/201, 200, 375/202, 205, 206; 370/18, 320, 335, 342, 441

[56] References Cited

U.S. PATENT DOCUMENTS

| | | | |
|---|---|---|---|
| 5,008,899 | 4/1991 | Yamamoto | 375/201 |
| 5,335,247 | 8/1994 | Olmstead | 375/200 |
| 5,546,420 | 8/1996 | Seshadri et al. | 375/200 |

*Primary Examiner*—Don N. Vo
*Attorney, Agent, or Firm*—Oblon, Spivak, McClelland, Maier & Neustadt, P.C.

[57] ABSTRACT

A spectrum spread communication system capable of preventing an increase in error rate irrespective of hit while keeping a communication speed from being reduced. A plurality of input data DS-modulated by a DS spread multiplier are fed to an array converter, wherein a first chip of each of the data is collected to form an FH first frame. Likewise, only second to seventh chips are collected to form FH second to seventh frames, respectively. The FH frames each are then subject to FH modulation in an FH spread multiplier and then transmitted. In a receive section, the data are returned to the original data array after FH demodulation, resulting in a burst error being a random error.

6 Claims, 10 Drawing Sheets

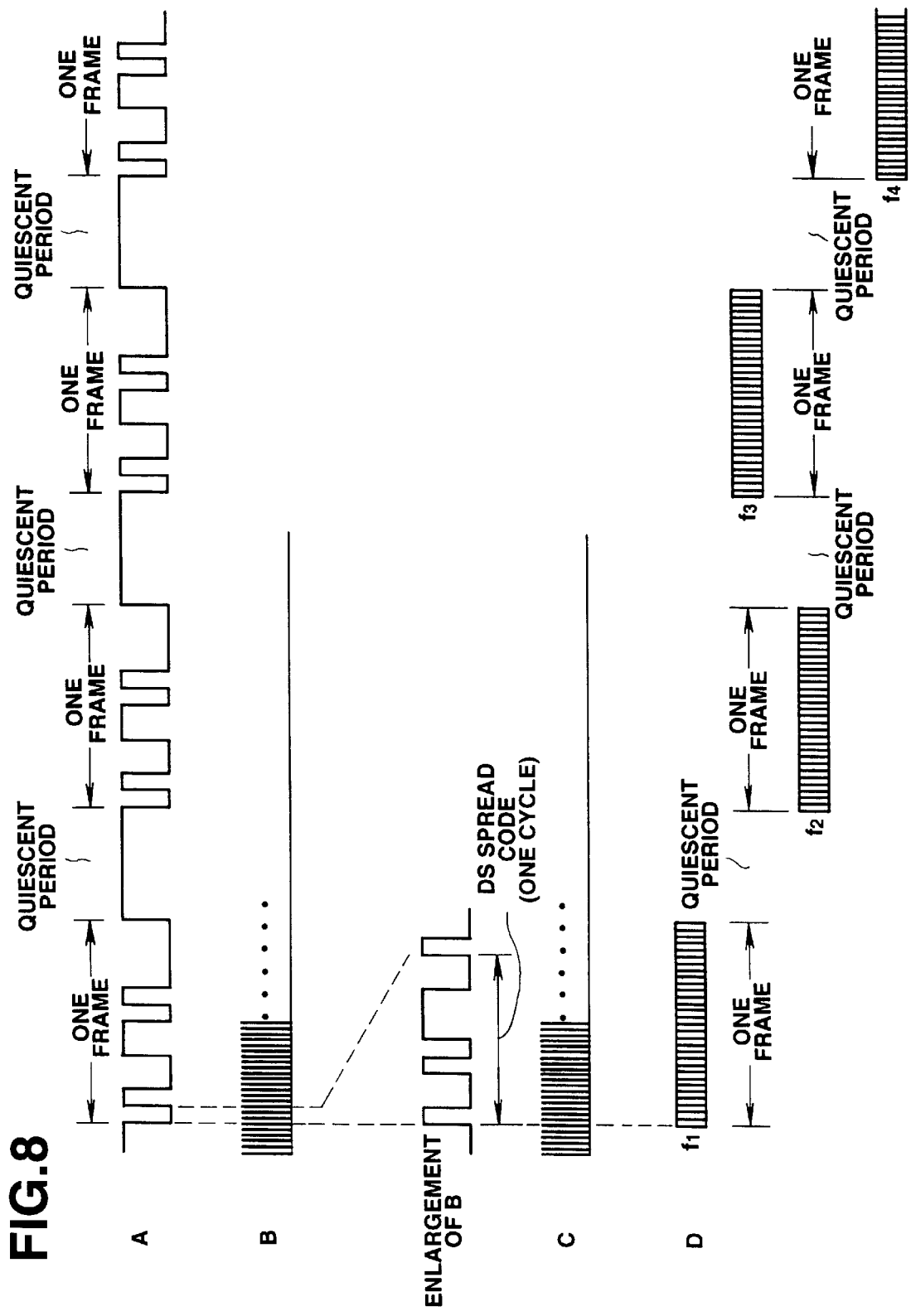

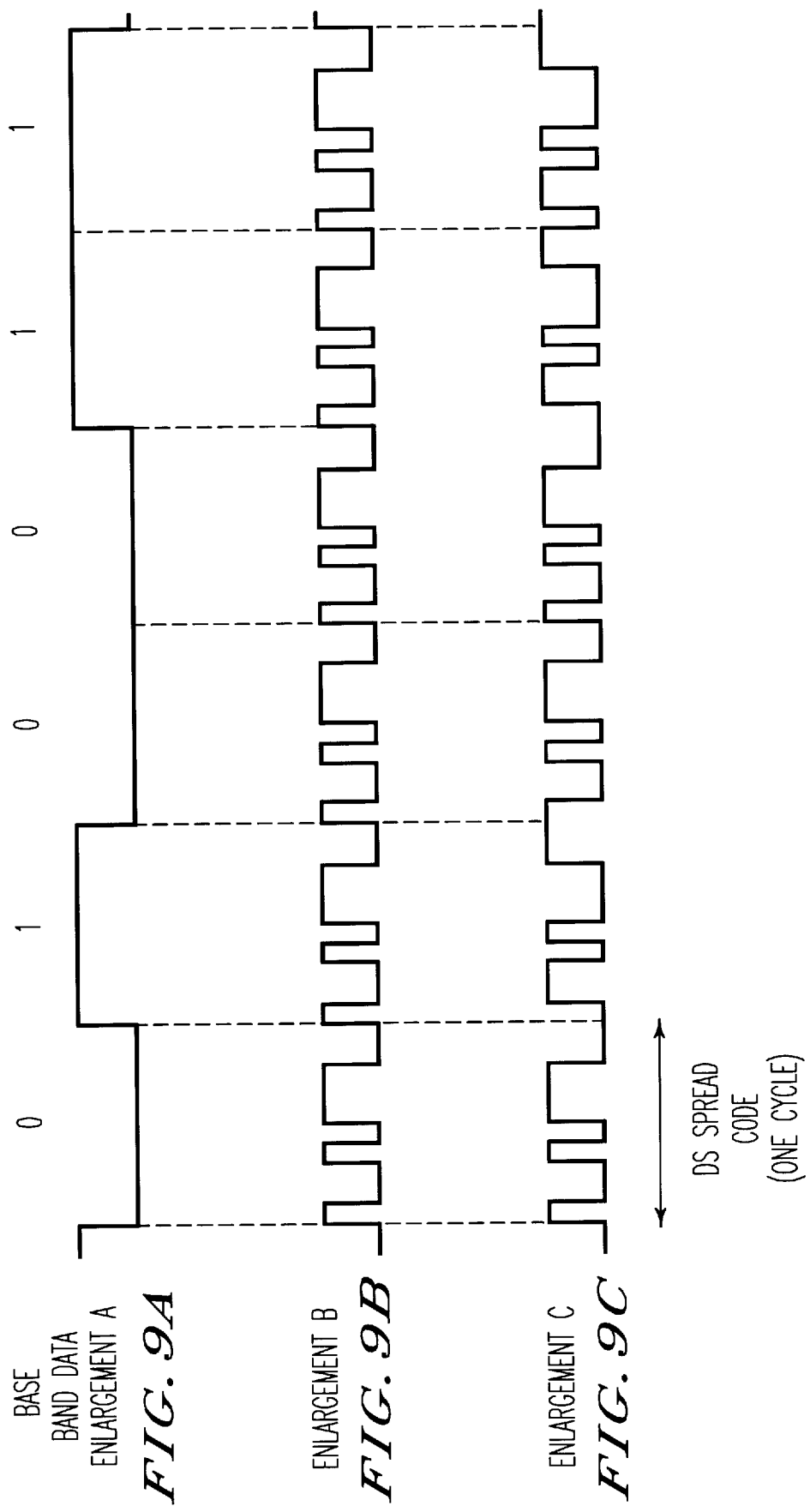
FIG. 9A BASE BAND DATA ENLARGEMENT A
FIG. 9B ENLARGEMENT B
FIG. 9C ENLARGEMENT C
DS SPREAD CODE (ONE CYCLE)

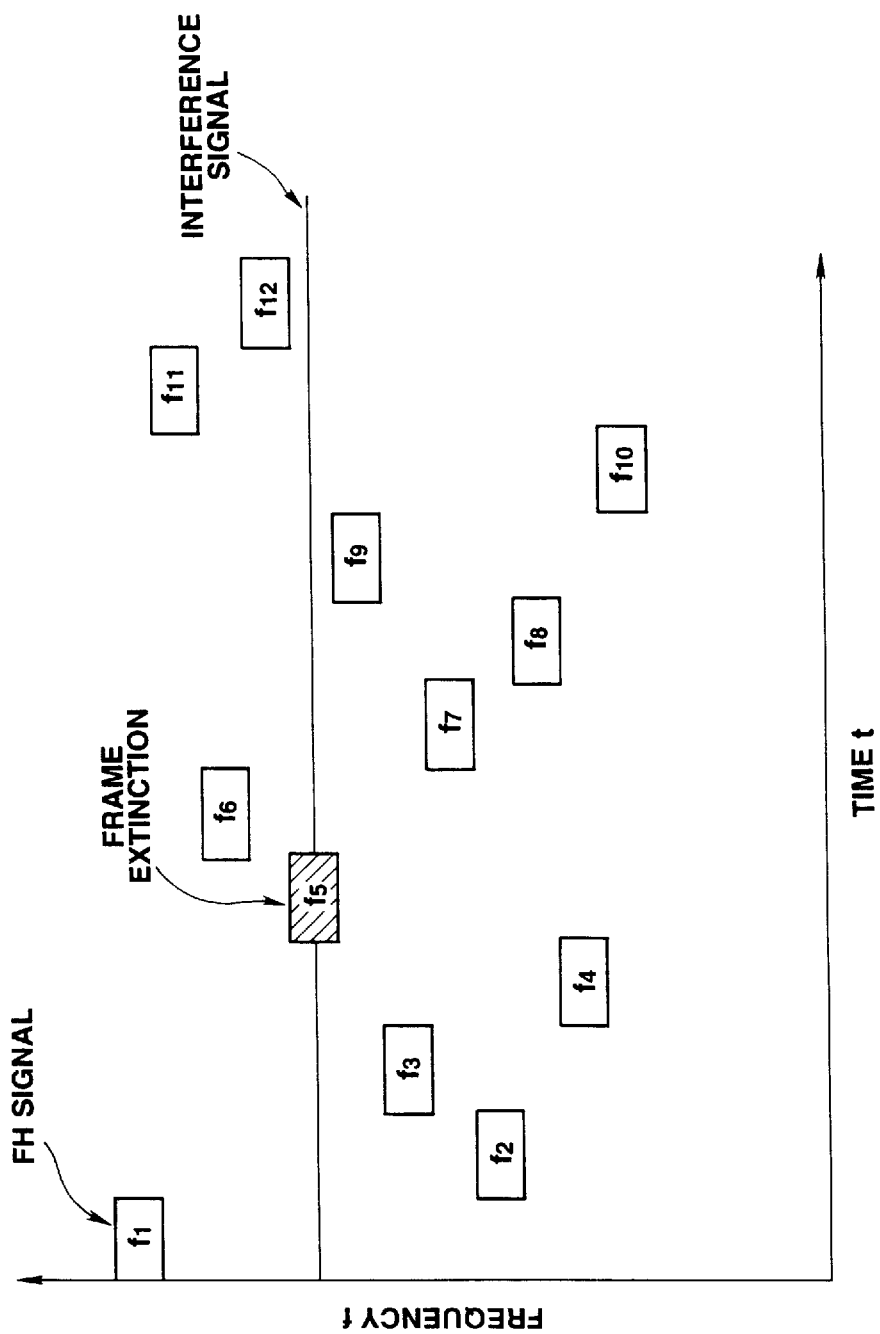

SPECTRUM SPREAD COMMUNICATION SYSTEM

BACKGROUND OF THE INVENTION

This invention relates to a spectrum spread communication system, and more particularly to a spectrum spread communication system adapted to provide reliable communication even in an environment of increased noise.

A spectrum spread (SS) communication system has been conventionally known in the art, and a direction spread system (hereinafter referred to as "DS system"), a frequency hopping system (hereinafter referred to as "FH system"), a hybrid DS/FH system comprising a combination of the DS system and FH system, and the like have been proposed for spectrum spread communication.

The DS system is adapted to subject original data to DS modulation by means of a code sequence called a spread code sequence, to thereby carry out communication. For this purpose, it is constructed so as to spread a spectrum of a signal by DS modulation to improve noise-proof characteristics. As a code sequence for spreading the spectrum of the signal is generally used a pseudo noise (PN) sequence code.

The FH system is adapted to carry out communication by changing over frequency channels at a predetermined cycle in a pseudo random order and in a predetermined order and is classified into a fast FH system and a slow FH system. The fast FH system is adapted to transmit data of one bit during retention of one frequency channel and the slow FH system is adapted to transmit data of plural bits (frame) during one frequency channel retention.

The hybrid DS/FH system is adapted to permit advantages of both DS system and FH system to be exhibited and generally constructed in such a manner as shown in FIG. 7.

More particularly, in FIG. 7, reference numeral 102 designates a DS spread code generator for generating a spread code such as a PN code or the like, 103 is a DC spread multiplier for multiplying an input data sequence 101 by the DS spread code to subject the sequence to DS modulation, 104 is an FH spread code generator for generating an FH spread code of each of frequency channels of a pseudo random order, 105 is an FH spread multiplier for multiplying the DS-modulated data sequence by the FH spread code to subject it to FH modulation and 106 is a transmit antenna acting as a transmit means, so that the DS spread code generator 102 to transmit antenna 106 cooperate with each other to constitute a transmit section 100.

Reference numeral 111 designates a receive antenna, 112 is an FH inverse spread multiplier for multiplying a receive signal by an FH spread code to subject it to FH demodulation, 113 is an FH spread code generator for generating an FH spread code identical with that of the FH spread code generator 104, 114 is a DS spread code generator for generating a DS spread code identical with that of the DS spread code generator 102 and 115 is a DS inverse spread multiplier for an FH-demodulated data sequence by a DS spread code sequence to subject it to DS demodulation, so that the receive antenna 111 to DS inverse spread multiplier 115 cooperate together to constitute a receive section 110.

Now, the manner of operation of the communication system of FIG. 7 constructed as described above will be described hereinafter with reference to FIGS. 8A to 8D and 9.

The input data sequence 101 has frames each formed of a plurality of bits as shown in FIG. 8A and quiescent periods defined between the frames. The quiescent period will be described hereinafter.

The input data sequence 101 is multiplied by a DS spread code (FIG. 8B) at one cycle for every bit in the DS spread multiplier 103, to thereby provide a DS-modulated signal C shown in FIG. 8C. The DS spread code, as enlargedly shown in FIG. 8B, is so constructed that one cycle thereof is formed into a pattern of a pulse waveform comprising a plurality of bits and is constituted by a PN code sequence. The PN code sequence has a spectrum spread in a manner similar to that of white noise, so that the DS modulation causes the input data sequence to be spectrum-spread.

The DS-modulated signal C is then fed to the FH spread code multiplier 105, wherein it is multiplied by an FH spread code produced by changing over frequency channels f1 to f5 in a predetermined pseudo order. This results in the FH spread multiplier 105 generating an FH-modulated signal subjected to frequency hopping as shown in FIG. 7D. More particularly, a first one frame of the input data sequence 101 is modulated by the frequency channel f1 and then outputted. Likewise, a second one frame is modulated by the frequency channel f2, a third one frame is modulated by the frequency channel f3, a fourth one frame is modulated by the frequency channel f4, and a fifth one frame is modulated by the frequency channel f5 (not shown).

The FH modulation thus carried out causes spectra of the input data sequence to be further spread.

The FH spread code comprising the frequency channels f1 to f5 is repeated at a predetermined cycle and patterns in which the frequency channels are changed over are predetermined in a manner different from each other depending on stations thereof. Also, the quiescent periods defined between the frequency channels each are provided to ensure outputting of a frequency of each of frequency channels stably changed over during changing-over of the frequency channels.

The DS modulation by the DS spread code is carried out in such a manner as shown in FIG. 9. More particularly, base band data which are the input data 101 are defined to be, for example, "010011 - - - ", of which a pulse waveform is as indicated by enlargement A in FIG. 9. Also, the DS spread code is repeatedly generated so that a pulse period of one bit of the base band data constitutes one cycle thereof as indicated at enlargement B in FIG. 9.

The DS spread multiplier 103 generally comprises an exclusive OR (EX-OR) circuit, so that the DS spread code is generated therefrom as it is when the base band data are "0", whereas it is outputted while being subject to phase inversion when the data are "1". Thus, the DS spread multiplier 103 generates a DS-modulated data sequence as indicated by enlargement C in FIG. 9 which is inverted only when the base band data are "1".

In the receive section 110, the signal generated from the FH spread multiplier 105 through the transmit antenna 106 is received by the receive antenna 111 and fed to the FH inverse spared multiplier 112, which functions to multiply the signal by an FH spread code generated by the FH spread code generator 113. The FH spread code is rendered identical with the FH spread code generated by the FH spread code generator 104 of the transmit section 100, resulting in being subject to FH demodulation by the FH inverse multiplier 112.

The FH demodulation thus carried out causes the FH spread code to be demodulated into a signal on which only DS modulation is carried out. The signal or data sequence thus provided is then fed to the DS inverse spread multiplier 115, resulting in being multiplied by a DS spread code. More particularly, in the DS inverse spread multiplier 115, the signal is multiplied by a DS spread code generated by the DS spread code generator 114 which is identical with the DS spread code generated by the DS spread code generator 102 of the transmit section 100.

The DS inverse spread multiplier 112 generally comprises a multiplier constituted by an EX-OR and a correlation unit constituted by an integrator for integrating an output of the multiplier by one cycle of the spread code. Thus, when the DS spread codes are identical in phase with each other, the multiplier generates a correlation signal of a negative peak; whereas when both are inverted in phase with respect to each other, a correlation signal of a positive peak is generated. This is utilized for outputting "0" as demodulated data when a negative correlation peak is outputted and "1" when a positive correlation peak is outputted. This permits the base band data transmitted from the transmit section 100 to be regenerated.

An SS communication system such as the hybrid DS/FH communication system described above or the like results in one communication path occupying a wide frequency band because of spreading a spectrum of a signal, however, it contributes to an improvement in S/N because of utilizing correlation between the FH spread code and the DS spread code. Also, allocation of copies perpendicular to each other between stations to the FH spread code and DS spread code permits the SS communication system to use a frequency band in a manner to be common to a plurality of stations. Further, the SS communication system exhibits noise-proof characteristics because of spreading a spectrum of a signal.

Nevertheless, the SS communication system has a possibility of causing data to be extinguished when any noise occurs at a specific frequency in a transmission path. Now, the disadvantage will be described hereinafter with reference to FIG. 10.

It is supposed that that a data sequence transmitted from the transmit section 100 is subject to FH modulation, leading to hopping of frequency channels as indicated at f1, f2, f3, f4, f5, f6, f7, f8, f9, f10, f11, - - - in FIG. 10, When noise of a specific frequency occurs at a frequency band of the frequency channel f5 in a transmission path, the noise forms an interference signal with respect to the frequency channel f5 as shown in FIG. 10.

Occurrence of the interference (hereinafter also referred to as "hit") leads to a bit error, to thereby increase an error rate. In this regard, occurrence of hit in the slow FH system or hybrid DS/FH system is adapted to transmit a plurality of bits of one frame in one frequency channel; therefore, when, for example, noise interferes with the frequency channel f5, the system causes all data in a frame of the frequency channel f5 to be extinguished.

Thus, it is required to transmit data identical with the extinguished data again. Unfortunately, this increases an overhead, leading to a decrease in speed, resulting in transmission efficiency being highly deteriorated.

In order to solve the problem, it would be considered that error correction is carried out using a read-solomon (RS) code or the like, so that a wrong bit is corrected for regeneration. However, this is impossible when data in a whole frame are wrong. Also, addition of an error-correcting code leads to addition of error-corrected data to data being transmitted, to thereby increase redundancy, so that a transmission rate is reduced.

SUMMARY OF THE INVENTION

The present invention has been made in view of the foregoing disadvantage of the prior art.

Accordingly, it is an object of the present invention to provide a spectrum spread communication system which is capable of preventing an increase in error rate of modulated data irrespective of occurrence of interference or hit.

It is another object of the present invention to provide a spectrum spread communication system which is capable of preventing a decrease in transmission rate.

In accordance with the present invention, a spectrum spread communication system is provided. The system includes a DS spread multiplier for multiplying an inlet data sequence by a DS spread code sequence, an array conversion means for carrying out conversion of data array of each of a plurality of input data sequences generated by the DS spread multiplier while using one chip of the DS spread code sequence as a unit, and an FH spread multiplier for multiplying a data sequence generated by the array conversion means by an FH spread code sequence, whereby an output signal of the FH spread multiplier is transmitted.

Also, in accordance with the present invention, a spectrum spread communication system is provided. The system includes an FH inverse spread multiplier for multiplying a receive signal by an FH spread code sequence, an inverse array conversion means for converting a data sequence generated by the FH inverse spread multiplier into original data array, and a DS inverse spread multiplier for multiplying a data sequence re-arrayed by the inverse array conversion means by a DS spread code sequence, whereby a base band data sequence demodulated by the DS inverse spread multiplier is provided.

Further, in accordance with the present invention, a spectrum spread communication system is provided. The system includes a DS spread multiplier for multiplying an inlet data sequence by a DS spread code sequence, an array conversion means for carrying out conversion of data array of each of a plurality of input data sequences generated by the DS spread multiplier while using one chip of the DS spread code sequence as a unit, an FH spread multiplier for multiplying a data sequence generated by the array conversion means by an FH spread code sequence, a transmit means for transmitting a signal generated by the FH spread multiplier, a receive means for receiving the signal transmitted by the transmit means, an FH inverse spread multiplier for multiplying the receive signal received by the receive means by an FH spread code sequence, an inverse array conversion means for converting a data sequence generated by the FH inverse spread multiplier into original data array, and a DS inverse spread multiplier for multiplying a data sequence re-arrayed by the inverse array conversion means by a DS spread code sequence, whereby a base band data sequence demodulated by the DS inverse spread multiplier is provided.

In a preferred embodiment of the present invention, the array conversion means converts the input data sequences into a data sequence in which only a first chip of a data sequence at each of n (n: an integer of 2 or more) cycles corresponding to n bits of the input data sequence, a data sequence in which only a second chip thereof is collected, - - - , and a data sequence in which only a m-th (m: the number of bits of DS code sequence) chip thereof is collected.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 8 is a timing chart showing DS modulation in the conventional spectrum spread communication system of FIG. 7;

FIG. 9 is a timing chart showing DS/FH modulation in the conventional spectrum spread communication system of FIG. 7; and FIG. 10 is a graphical representation showing interference in the conventional spectrum spread communication system.

DETAILED DESCRIPTION OF THE PREFERRED EMBODIMENT

Now, a spectrum spread communication system according to the present invention will be described hereinafter with reference to FIGS. 1 to 6.

Figure 1:
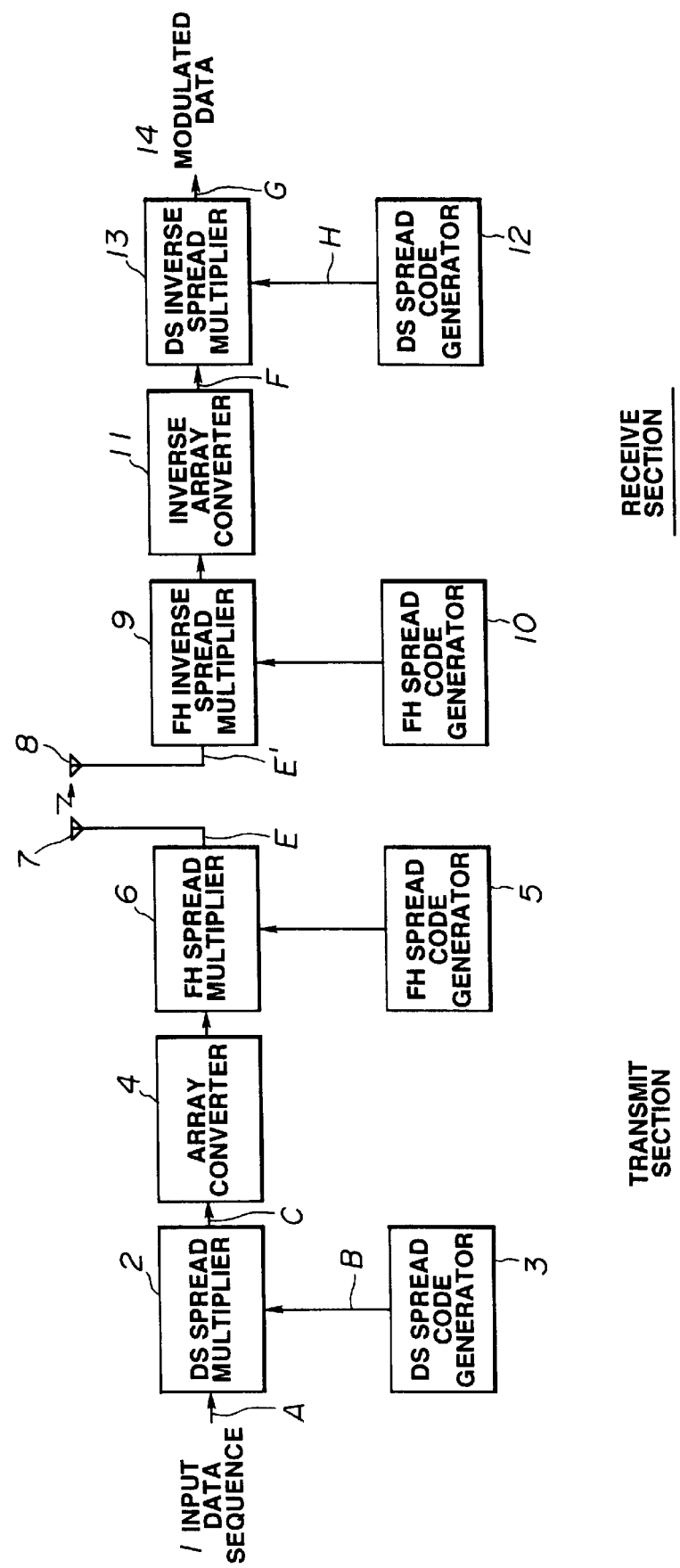
FIG. 1 is a block diagram showing an embodiment of a spectrum spread communication system according to the present invention.

Referring first to FIG. 1, an embodiment of a spectrum spread communication system according to the present invention is illustrated, which is in the form of a hybrid DS/FH system.

In FIG. 1, reference numeral 2 designates a DS spread multiplier for multiplying an input data sequence 1 by a DS spread code subsequence B to subject it to DS modulation, 3 is a DS spread code generator for generating the DS spread code sequence B such as a PN code or the like, 4 is an array converter for converting a data array of the DS-modulated data sequence, 5 is an FH spread code generator for generating an FH spread code sequence comprising frequency channels of a pseudo random order, 6 is an FH spread multiplier for multiplying the data sequence of which an array is converted by the FH spread code sequence to subject the data sequence to FH modulation, and 7 is a transmit antenna acting as a transmission means. Thus, the DS spread code multiplier 2 to transmit antenna 7 cooperate with each other to constitute a transmit section.

Also, reference numeral 8 designates a receive antenna, 9 is an FH inverse spread multiplier for multiplying a receive signal by an FH spread code sequence to subject it to FH demodulation, 11 is an inverse array converter for returning a data array converted by the array converter 4 to an original data array F, 12 is a DS spread code generator for generating an DS spread code sequence H identical with that of the DS spread code generator 3 of the transmit section, and 13 is a DS inverse spread multiplier for multiplying the data sequence returned to the original data array F by the DS spread code sequence H to subject it to DS demodulation, so that the receive antenna 8 to DS inverse multiplier cooperate together to constitute a receive section.

Now, the manner of operation of the spectrum spread communication system of the illustrated embodiment constructed as described above will be described hereinafter with reference to FIGS. 2 to 6 as well as FIG. 1. In the illustrated embodiment, DS spread and FH spread of the data sequence may be carried out in substantially the same manner as those in the conventional spectrum spread communication system described above with reference to FIGS. 7 to 10.

Figure 2:
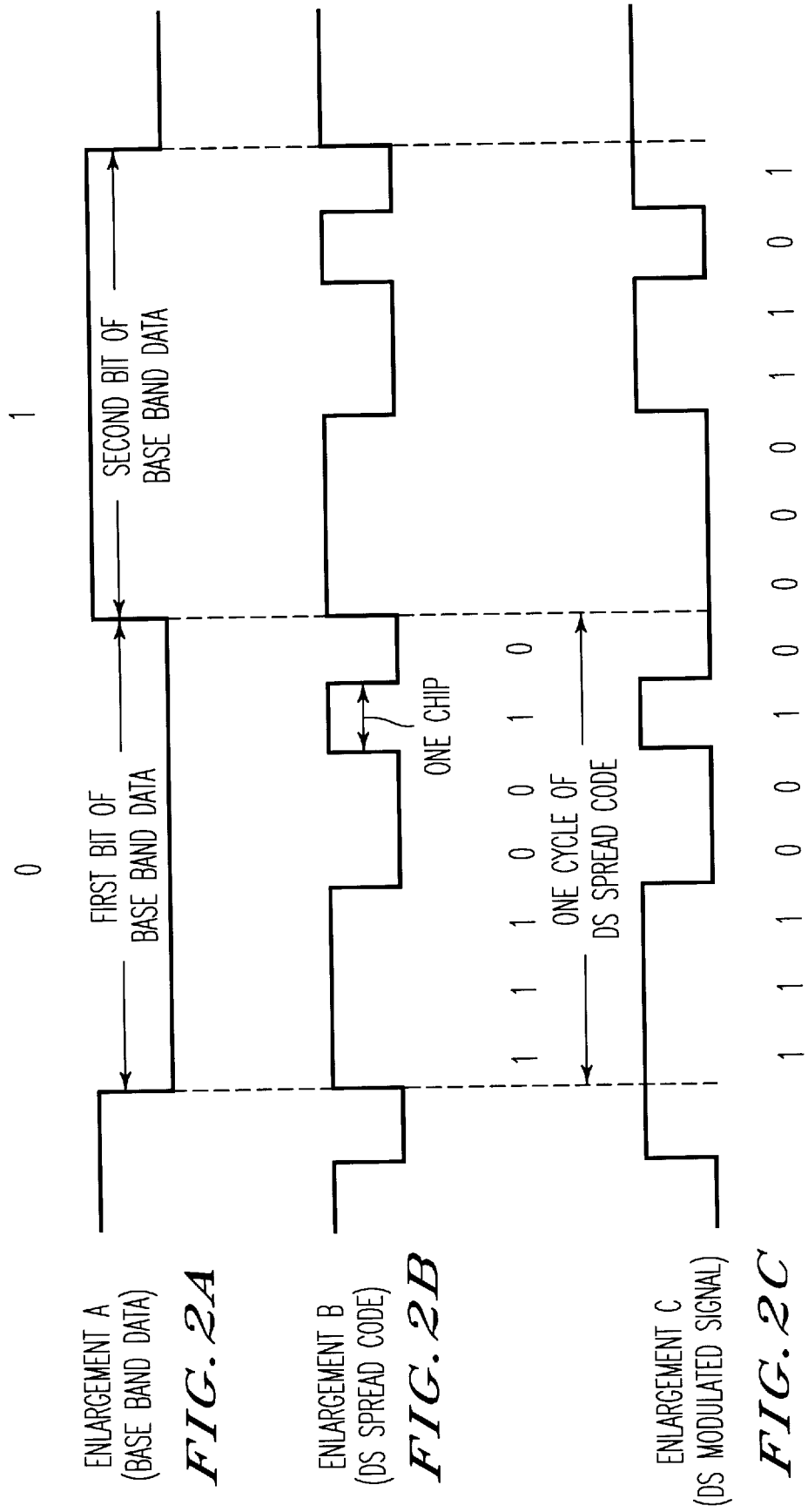
FIG. 2 is a timing chart showing DS modulation in the spectrum spread communication system of FIG. 1.

FIG. 2 shows DS spread carried out on an input data sequence or base band data sequence (enlargement A). In FIG. 2, an axis of abscissas indicating time is enlargedly shown for the sake of brevity, so that only first two bits of the base band data sequence are shown.

As shown in FIG. 2, the DS spread code generator 3 generates a DS spread code sequence of one cycle during a period of one bit of the base band data sequence and the DS spread multiplier 2 multiplies the base band data sequence by the DS spread code sequence. The DS spread multiplier 2 may comprise, for example, an EX-OR circuit. A first bit of the base band data sequence is "0" as shown in FIG. 2, so that the DS spread code sequence is outputted from the multiplier 2 as it is (enlargement C in FIG. 2); whereas a second bit of the base band data sequence is "1", so that the multiplier 2 generates the DS spread code sequence while inverting a phase of the sequence as indicated by enlargement A in FIG. 2.

Thus, when the DS spread code sequence is defined to be, for example, "1110010", DS modulation of two bits "01" of the base band data sequence by the DS spread multiplier 2 causes the data sequence to be "11100100001101" as indicated at enlargement C in FIG. 2. More particularly, the DS modulation causes one bit of the base band data sequence to be represented by seven bits of the DS spread code sequence.

The term "one chip" used herein means one bit of the DS spread code sequence as indicated by enlargement B in FIG. 2, therefore, one bit of the base band data sequence is represented by seven chips.

Figure 3:
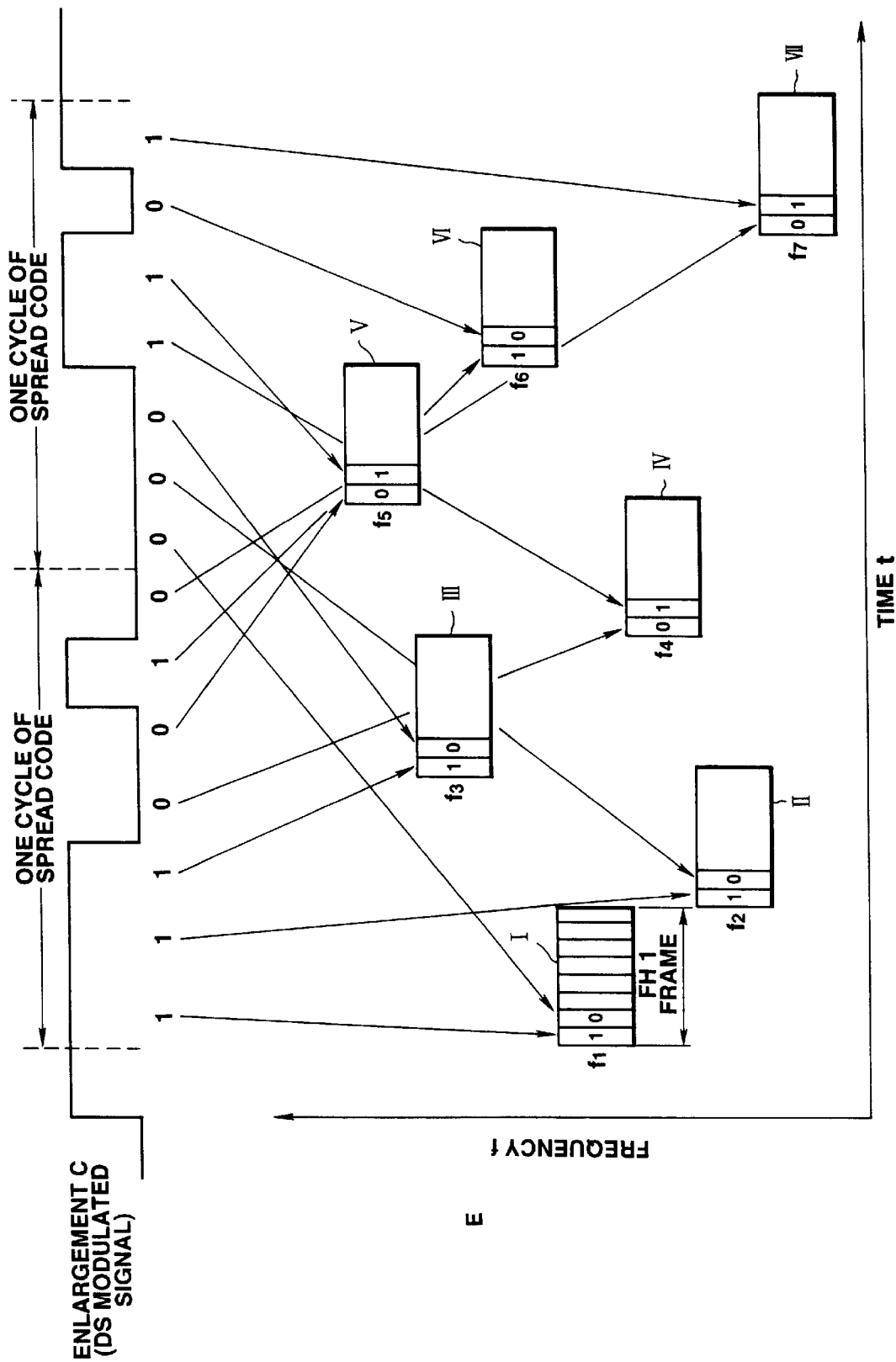
FIG. 3 is a diagrammatic view showing array conversion in the spectrum spread communication system of FIG. 1.

Now, data array conversion carried out in the array converter 4 will be described hereinafter with reference to FIG. 3. FIG. 3 shows a DS-modulated data sequence which is fed to the array converter 4, as indicated by enlargement C. In the array converter 4, first one of each seven chips of the DS spread code sequence which represents each one bit of the DS-modulated base band data sequence is collected to define an FH first frame I.

In the illustrated embodiment, the FH frame is constituted by eight bits, so that in order to convert array of the data sequence to prepare the FH first frame I, data on the first chip of the DS-modulated data sequence at each of eight cycles obtained by subjecting eight bits of the base band data sequence to DS modulation are collected to produce one FH frame.

Then, data on only the second chip of the DS-modulated data sequence at each of the eight cycles are collected to constitute an FH second frame II. Likewise, data on each of third to seventh chips of the DS-modulated data sequence at each of the eight cycles are collected to constitute FH third to seventh frames III to VII, respectively.

Array Conversion of the DS-modulated data sequence thus carried out permits the FH first to seventh frames I to VII to be prepared, which are then fed to the FH spread multiplier 6 in order, so that the FH spread multiplier 6 multiplies the FH frames by an FH spread code sequence generated by the FH spread code generator 5. This results in the FH spread multiplier 6 generating an FH-modulated signal which has been subject to frequency hopping as indicated by E in FIG. 3.

More particularly, the FH first frame I is modulated by a channel frequency f1 and the FH second frame II is modulated by a channel frequency f2. Likewise, the FH third to seventh frames III to VII are modulated by channel frequencies f3 to f7, respectively, to thereby provide a frequency channel pattern of a pseudo random order as shown in FIG. 3.

The FH-modulated signal hopped by each of the channel frequencies f1 to f7 is then transmitted from the transmit antenna 7 of the transmit section.

Figure 4:
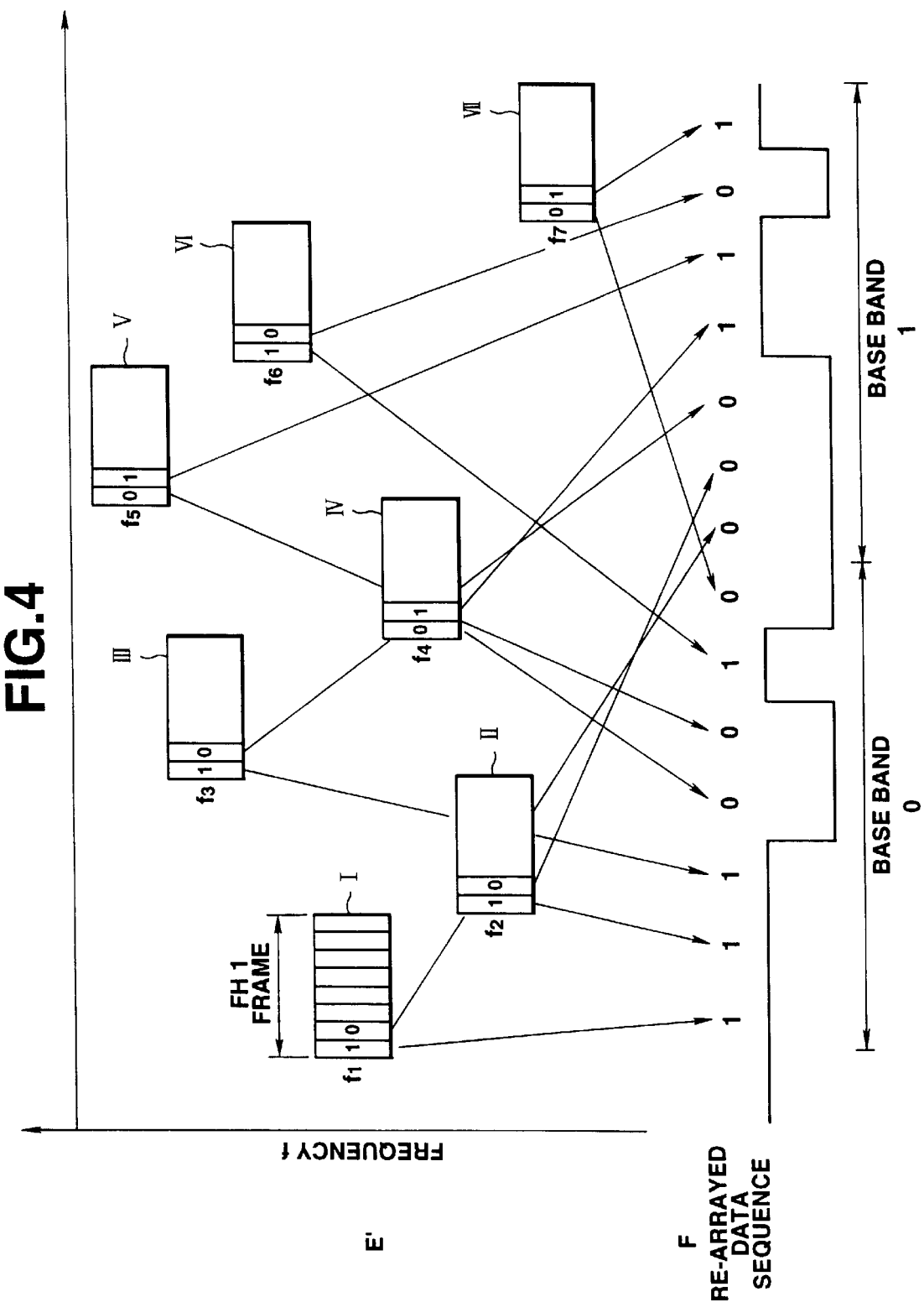
FIG. 4 is a diagrammatic view showing inverse array conversion in the spectrum spread communication system of FIG. 1.

The FH-modulated signal thus transmitted is then received by the receive antenna 8, which signal is indicated by E' in FIG. 4. Then, the signal is fed to the FH inverse spread multiplier 9, which multiplies the signal by an FH spread code sequence comprising the channel frequencies f1 to f7 which is fed from the FH spread code generator 10 thereto. The FH spread code multiplied is rendered identical with the FH spread code generated by the FH spread code generator 5, so that an FH-demodulated data sequence may be generated by the FH inverse spread multiplier 9. The FH-demodulated data sequence is then fed to the inverse array converter 11.

The inverse array converter 11 collects only first bits of seven FH frames to re-array the original DS-modulated data sequence (DS spread code sequence for one cycle) by means of seven chips thus collected. Also, only second bits thereof are collected to re-array seven chips, to thereby provide the original DS-modulated data sequence. Likewise, only fourth bits, fifth bits, sixth bits and seven bits each are collected to re-array seven chips, to thereby provide the original DS-modulated data sequence.

The data sequence thus re-arrayed is indicated by F in FIG. 4, wherein only two bits of the base band data sequence or fourteen chips are shown for the sake of brevity.

The data sequence thus re-arrayed by the inverse array converter 11 is then fed to the DS inverse spread multiplier 13, to thereby be multiplied by a DS spread code sequence H generated by the DS spread code generator 12. This results in the data sequence being DS-demodulated, so that demodulated data 14 may be regenerated.

The DS spread code sequence generated from the DS spread code generator 12 is rendered identical with the DS spread code sequence B generated by the DS spread code generator 3 and the DS inverse spread multiplier 13 is constituted by a correlation unit comprising an EX-OR and an integrator for integrating an output of the EX-OR by one cycle of the DS spread code sequence.

Now, the manner of operation of the DS inverse spread multiplier 13 will be described hereinafter with reference to FIG. 5.

Multiplication of the re-arrayed data sequence F by the DS spread code sequence H generated by the DS spread code generator 12 in the EX-OR causes an output thereof to be negative when both are identical in code and phase with each other. Thus, the integrator integrates the negative value thus obtained, so that a correlation peak G is rendered negative at an end of one cycle of the DS spread code sequence. Such generation of the negative correlation peak is due to multiplication of the DS spread code sequences identical in phase with each other. Also, transmission at the same phase is carried out when the base band data sequence is "0", so that the base band data sequence demodulated is "0".

When the DS spread code sequences are different from each other, the correlation peak does not occur. Thus, any demodulated data are not generated.

When the re-arrayed data sequence F and the DS spread code sequence H are identical in code with each other and inverse in phase with respect to each other, a multiplication output of the EX-OR is rendered positive, so that the integrator integrates the positive value thus obtained.

Also, when the re-arrayed data sequence F and DS spread code sequence H are identical in code and inverse in phase with respect to each other, an output of the EX-OR by multiplication is rendered positive, therefore, the integrator integrates the positive value thus obtained. This results in a positive correlation peak G occurring at an end of one cycle of the DS spread code sequence as shown in FIG. 5. Such a positive correlation peak is generated when the DS spread code sequences inverse in phase with respect to each other are multiplied by each other. Transmission of the sequences while being kept inverse in phase is carried out when the base band data sequence is "1", so that the base band data sequence demodulated is "1".

When the DS spread code sequences are different, the correlation peak does not occur; so that any demodulated data are not generated.

Now, the case that interference or hit occurs at a specific frequency channel to cause data at the frequency channel to be wrong will be considered hereinafter.

Even when all data in an FH frame concerned with hit are wrong, only one of seven chips is merely lost with respect to a base band data sequence of one bit comprising seven chips after the inverse array conversion, because the FH frame is constituted by one chip of each of eight bits of the base band data sequence as shown in FIG. 3.

Figure 5:
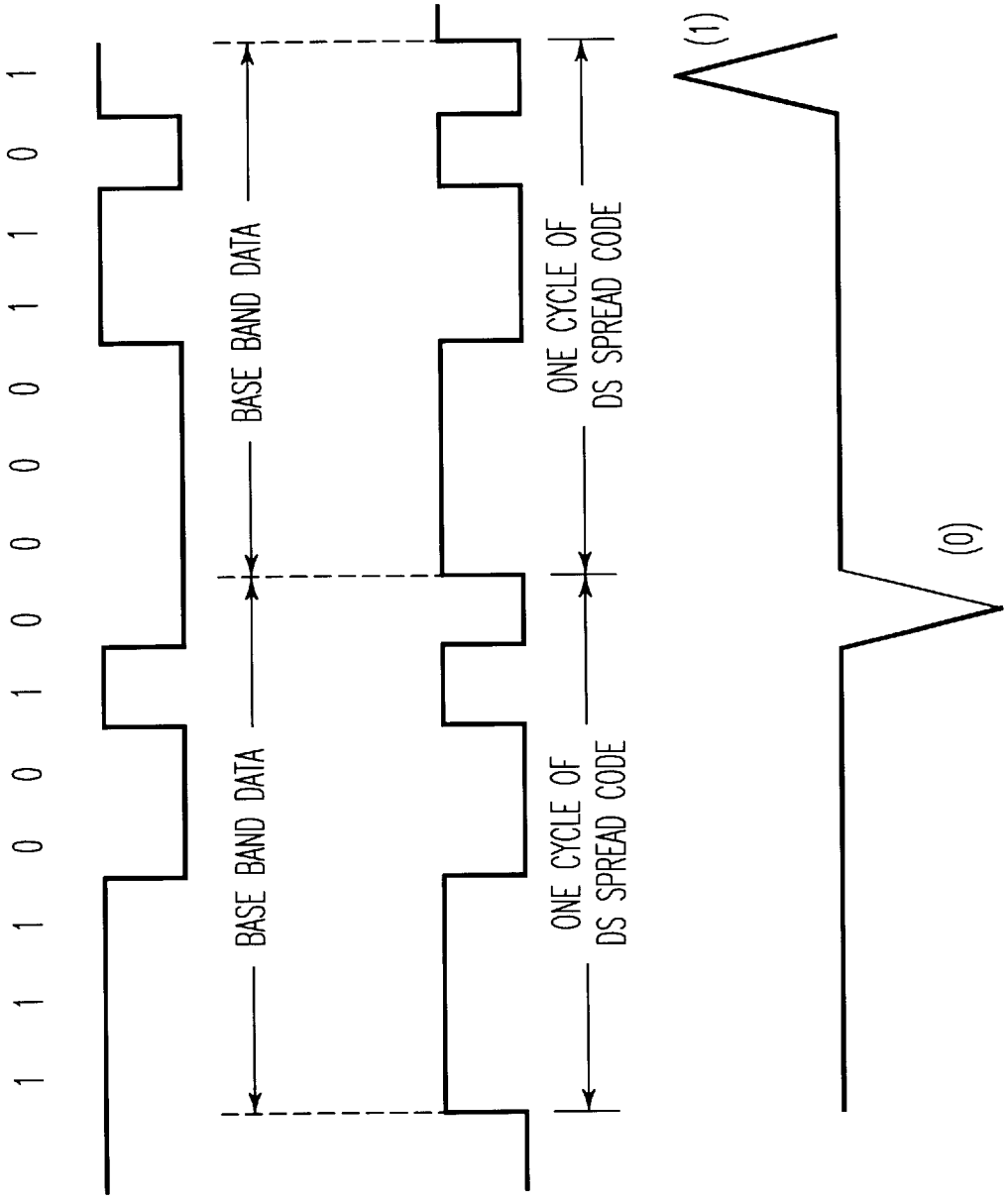
FIG. 5 is a timing chart showing DS demodulation in the spectrum spread communication system of FIG. 1.

When wrong data in an FH frame are demodulated without being corrected, such a correlation peak as indicated by G in FIG. 5 appears although a peak value thereof is somewhat decreased, because it is one chip that is wrong with respect to one bit of the re-arrayed base band data sequence; so that demodulation may be carried out without mistaking the base band data sequence.

Thus, the illustrated embodiment permits a burst error to be a random error; so that even when hit occurs in a plurality of frequency channels and a plurality of FH frames are wrong, an increase in error rate of the demodulated data sequence is rendered gentle.

Addition of an error-correcting code is carried out to correct an error of the data sequence after an inverse array conversion treatment in the inverse array converter 11 of the receive section. In this regard, the illustrated embodiment, as described above, permits the burst error to be the random error, so that even a simple error-correcting code leads to an improvement in error rate.

The input data may be so constructed that quiescent periods each are provided between the frames. However, such arrangement of the quiescent period is eliminated changing-over of the frequency channels is accomplished at an increased speed.

Figure 6:
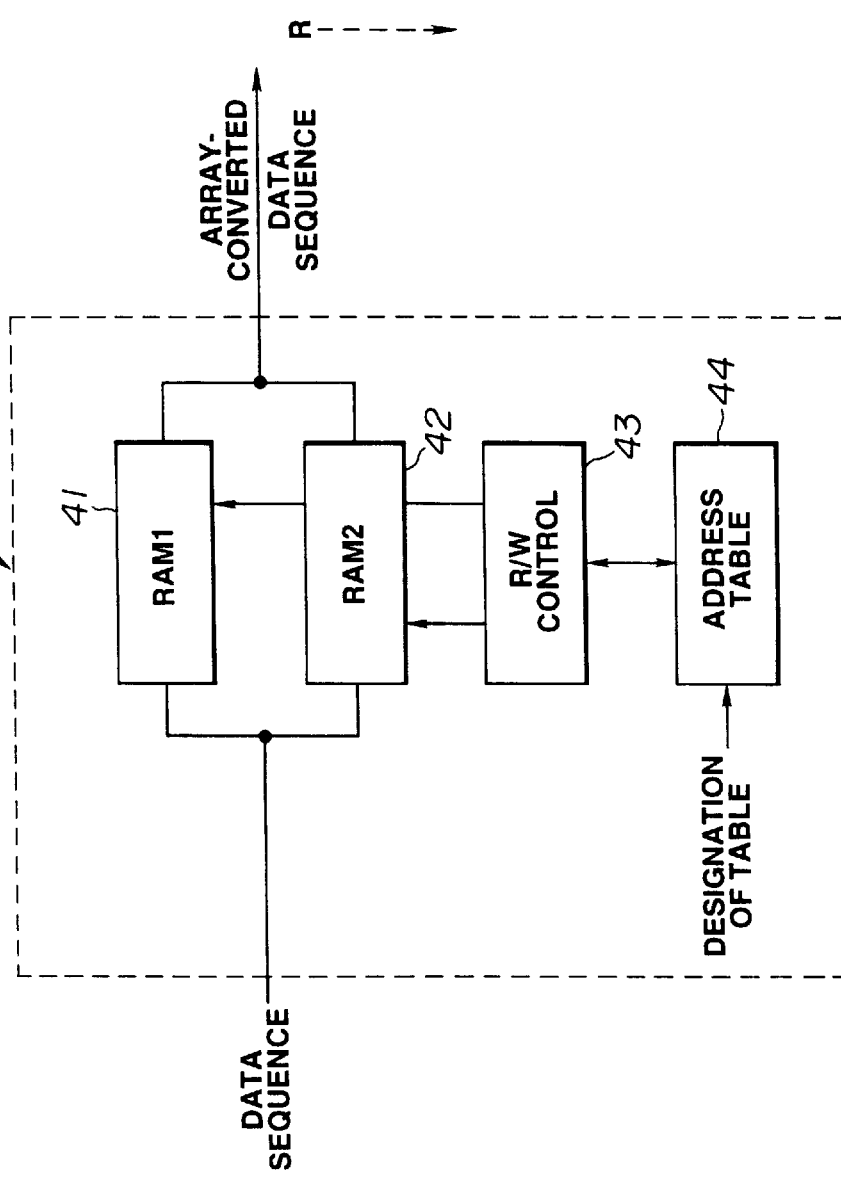
FIGS. 6(a) and 6(b) each are a diagrammatic view showing an array converter by way of example.
Figure 7:
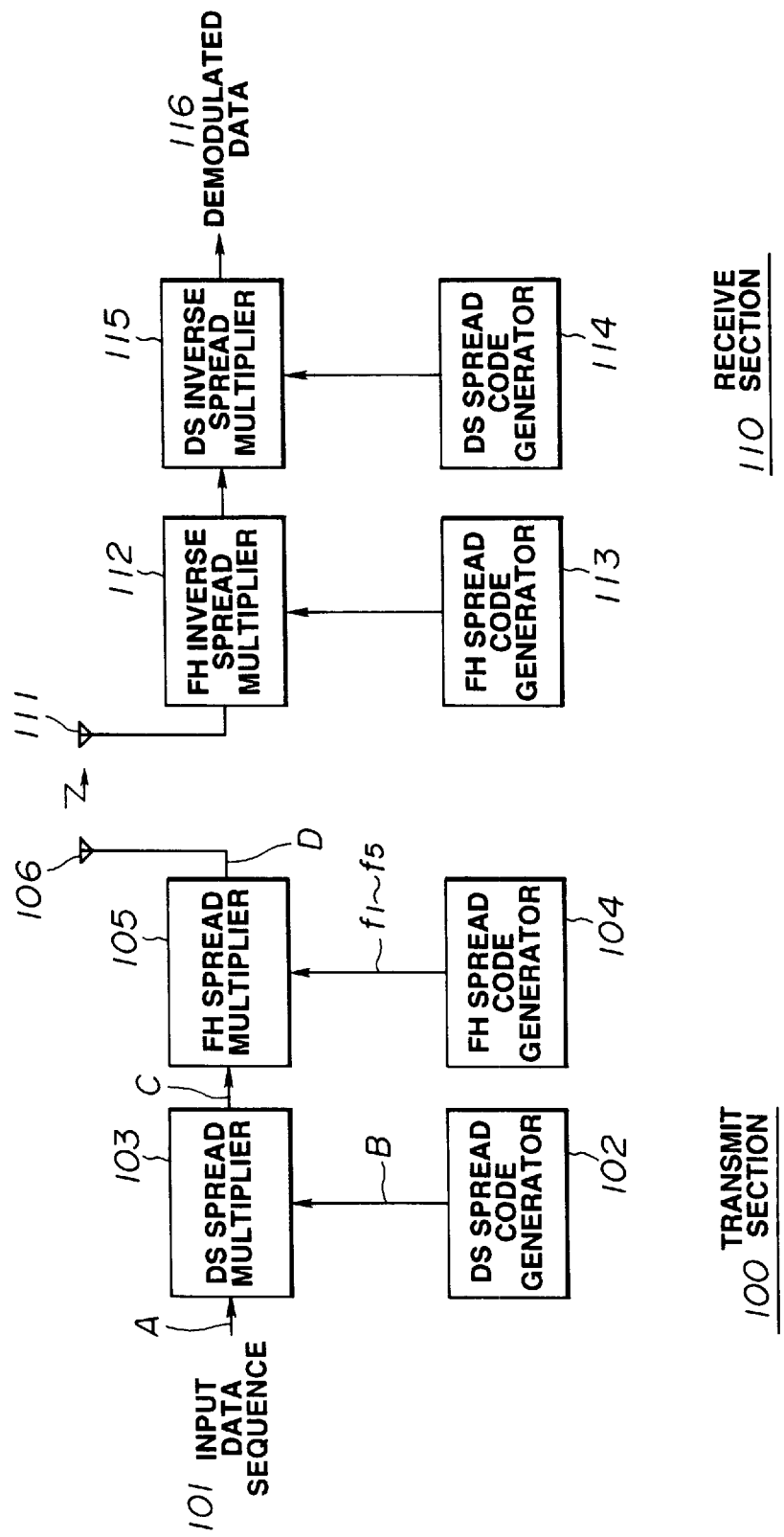
FIG. 7 is a block diagram showing a conventional spectrum spread communication system.

The array converter 4 may be constructed in such a manner as shown in FIG. 6($a$) by way of example. In FIG. 6($a$), reference numerals 41 and 42 each designate a random access memory (RAM) in which 56 chips of a DS-modulated data sequence fed to the array converter 4 are alternately stored. 43 is an R/W control circuit for controlling read and write of the RAMs 41 and 42. 44 is an address table wherein a plurality of sets of read addresses or write addresses which are referred to during read or write of the RAMs 41 and 42 are stored.

In the array converter 4 constructed as described above, a DS-modulated data sequence is fed to, for example, the RAM 41, so that 56 chips of the data sequence are stored in the RAM 41 in order under control of the R/W control circuit 43. The storage results in the RAM 41 having such a memory map as shown in FIG. 6(b). In FIG. 6(b), $a_{11}$, $a_{12}$, - - - $a_{17}$; $a_{21}$, $a_{22}$ - - - $a_{27}$; - - - ; $a_{81}$, $a_{82}$ - - - $a_{87}$ arrayed in a lateral direction each correspond to one bit of the input data sequence and comprise 7 chips, and 8 chips are arrayed in a vertical direction. Thus, 8 bits of the input data sequence are stored in the RAM 41.

When 56 chips of the data sequence are thus stored in the RAM 41, the subsequent data sequence is stored in the RAM 42, so that 56 chips of the data sequence are likewise stored in the RAM 41. The storage is controlled by the R/W control circuit 43.

Concurrently, the RAM 41 is rendered ready for read of the data sequence, so that the data sequence stored in the read address provided by the R/W control circuit 43 is read out. The read address used at this time is an address which carries out read in the vertical direction or an address which carries out read of the data sequence in order of $a_{11}$, $a_{21}$, - - - $a_{81}$; $a_{12}$, $a_{22}$ - - - $a_{82}$; - - - ; $a_{17}$, - - - $a_{27}$ - - - $a_{87}$ as shown in FIG. 6(b). In this instance, the data sequence $a_{11}$, $a_{21}$ - - - $a_{81}$ each constitute a first chip of each of 8 bits of the input data sequence; $a_{12}$, $a_{22}$ - - - $a_{82}$ each constitute a second chip thereof; - - - ; and $a_{17}$, $a_{27}$ - - - $a_{87}$ constitute a seventh chip thereof.

Thus, it will be noted that the data sequence read is different in data array from that written and array conversion of the data sequence is carried out depending on an order of addressing of the read address.

Now, the FH frame will be further described with reference to FIG. 3. As described above, the first frame of the FH frame is constituted by the first chip of each of eight bits of the input data sequence, the second frame of the FH frame is constituted by the second chip of each of the eight bits, - - - , and the seventh frame is likewise constituted by the seventh chip of each of the eight bits. Thus, when the data sequence read from the RAM 41 is divided for every 8 chips from the top and the FH frame is constituted by each divided data sequence, the seven FH frames shown in FIG. 3 may be provided.

Formation of such seven FH frames indicates that all data sequences are read from the RAM 41. This causes the data sequence of 56 chips to be written in the RAM 42. Thus, the above-described processing is repeated while placing the RAMs 41 and 42 under write and read conditions again, respectively.

Arrangement of two RAMs 41 and 42 in the illustrated embodiment permits an operation of placing one of them under the read condition while placing the other RAM under the write condition to be alternately carried out, so that the data sequence successively input may be written without interruption. Also, this permits the data sequence stored to be read in a manner to be outputted without interruption.

Further, the address table includes, in the form of a table, the addresses capable of carrying out the above-described array conversion. In addition, the address table includes addresses of a predetermined random order as plural kinds of tables. Conversion of data array using each of the addresses of a random order as a read address permits a burst error possibly generated due to extinction of the FH frame prepared to be changed to a random error by inverse array conversion.

Any one of the plural tables may be optionally designated by a table designation signal.

The inverse array converter 11 of the receive section may be constructed in substantially the same manner as the array converter 4 described above. In the inverse array converter 11, an R/W control section includes a write/read address constructed in a manner reverse to the read/write address on the side of the array converter 4. Also, plural kinds of address tables for an address table in the inverse array converter 11 may be constructed in substantially the same manner as those for the array converter 4.

Moreover, the array converter 4 may be provided with, for example, write addresses of a random order. This permits write to be randomly carried out so as to ensure array conversion of the data sequence during write.

As can be seen from the foregoing, the present invention ensures positive demodulation of data without any error even when interference or hit occurs at a specific frequency channel to cause extinction of data of the whole frame. Thus, an increase in error rate of the demodulated data may be effectively prevented.

Also, an increase in error rate is kept gentle even when the number of frequency channels associated with hit is increased, resulting in a rapid increase in error rate being effectively prevented.

Further, the present invention advantageously prevents a decrease in transmission rate because addition of an error-correcting code or the like is eliminated.

The present invention, even when an error-correcting code is added, exhibits advantageous characteristics of extensively improving an error rate by a simple correction procedure, because it permits a burst error to be a random error.

While a preferred embodiment of the present invention has been described with reference to the drawings, obvious modifications and variations are possible in light of the above teachings. It is therefore to be understood that within the scope of the appended claims, the invention may be practiced otherwise than as specifically described.

What is claimed is:

1. A spectrum spread communication system comprising:

a DS spread code generator for generating a DS spread code sequence containing a plurality of bits;

a DS spread multiplier for multiplying an inlet data sequence by said DS spread code sequence, wherein one cycle of the DS spread code sequence corresponds to one bit of the inlet data sequence, to obtain a modulated DS spread code sequence containing a plurality of chips which correspond to one bit of the inlet data sequence;

an array conversion means for carrying out conversion of data array of each of a plurality of input data sequences generated by said DS spread multiplier while using one chip of said DS spread code sequence as a unit by converting chips from each data sequence into different frames; and an FH spread multiplier for multiplying a data sequence generated by said array conversion means by an FH spread code sequence, while using one chip of the modulated DS spread code sequence as a unit of an FH frame;

whereby an output signal of said FH spread multiplier is transmitted so that each chip of an input data sequence is transmitted at a different frequency.

2. A Spectrum spread communication system as defined in claim 1, wherein said array conversion means converts said input data sequences into a data sequence in which only a first chip of a data sequence at each of n (n: an integer of 2 or more) cycles corresponding to n bits of said input data sequence, a data sequence in which only a second chip thereof is collected, - - -, and a data sequence in which only a m-th (m: the number of bits of DS code sequence) chip thereof is collected.

3. A spectrum spread communication system comprising:
an FH inverse spread multiplier for multiplying a receive signal by an FH spread code sequence having a unit of an FH frame;
an inverse array conversion means for converting a data sequence generated by said FH inverse spread multiplier into original data array by recreating an input data sequence by combining chips from different frames into a bit;
a DS spread code generator for generating a DS spread code sequence containing a plurality of bits; and a DS inverse spread multiplier for multiplying a data sequence re-arrayed by said inverse array conversion means by said DS spread code sequence, wherein one cycle of the DS spread code sequence corresponds to one bit of an input data sequence;
wherein one chip of the DS spread code sequence is used as said unit of the FH frame;
whereby a base band data sequence demodulated by said DS inverse spread multiplier is provided.

4. A Spectrum spread communication system as defined in claim 3, wherein said inverse array conversion means converts said data sequences into a data sequence in which only a first chip of a data sequence at each of n (n: an integer of 2 or more) cycles corresponding to n bits of said input data sequence, a data sequence in which only a second chip thereof is collected, - - -, and a data sequence in which only a m-th (m: the number of bits of DS code sequence) chip thereof is collected.

5. A spectrum spread communication system comprising:
a DS spread code generator for generating a DS spread code sequence containing a plurality of bits;
a DS spread multiplier for multiplying an inlet data sequence by said DS spread code sequence wherein one cycle of the DS spread code sequence corresponds to one bit of the inlet data sequence, to obtain a modulated DS spread code sequence containing a plurality of chips which correspond to one bit of the inlet data sequence;
an array conversion means for carrying out conversion of data array of each of a plurality of input data sequences generated by said DS spread multiplier while using one chip of said DS spread code sequence as a unit by converting chips from each data sequence into different frames;
an FH spread multiplier for multiplying a data sequence generated by said array conversion means by an FH spread code sequence, while using one chip of the modulated DS spread code sequence as a unit of an FH frame;
a transmit means for transmitting a signal generated by said FH spread multiplier so that each chip of an input data sequence is transmitted at a different frequency;
a receive means for receiving the signal transmitted by said transmit means;
an FH inverse spread multiplier for multiplying the receive signal received by said receive means by an FH spread code sequence;
an inverse array conversion means for converting a data sequence generated by said FH inverse spread multiplier into original data array by recreating an input data sequence by combining chips from different Frames into a bit; and
a DS inverse spread multiplier for multiplying a data sequence re-arrayed by said inverse array conversion means by a DS spread code sequence
wherein a base band data sequence demodulated by said DS inverse spread multiplier is provided.

6. A Spectrum spread communication system as defined in claim 5, wherein said array conversion means converts said input data sequences into a data sequence in which only a first chip of a data sequence at each of n (n: an integer of 2 or more) cycles corresponding to n bits of said input data sequence, a data sequence in which only a second chip thereof is collected, - - -, and a data sequence in which only a m-th (m: the number of bits of DS code sequence) chip thereof is collected.

* * * * *